United States Patent
Gerwe et al.

(10) Patent No.: US 12,298,468 B2
(45) Date of Patent: May 13, 2025

(54) MULTI-SPECTRAL AND POLARIZATION IMAGING APPARATUS WITH ATMOSPHERIC SOUNDING FILTERS AND ASSOCIATED SYSTEM AND METHOD

(71) Applicant: The Boeing Company, Chicago, IL (US)

(72) Inventors: David R. Gerwe, West Hills, CA (US); Friedrich W. Kunzler, Hacienda Heights, CA (US); Kevin R. Paxton, North Tustin, CA (US)

(73) Assignee: The Boeing Company, Arlington, VA (US)

( * ) Notice: Subject to any disclaimer, the term of this patent is extended or adjusted under 35 U.S.C. 154(b) by 221 days.

(21) Appl. No.: 17/967,215

(22) Filed: Oct. 17, 2022

(65) Prior Publication Data
US 2024/0125973 A1    Apr. 18, 2024

(51) Int. Cl.
*G01J 3/28* (2006.01)
*G01J 3/02* (2006.01)
(Continued)

(52) U.S. Cl.
CPC ............ *G01W 1/16* (2013.01); *G01J 3/0224* (2013.01); *G01J 3/0229* (2013.01);
(Continued)

(58) Field of Classification Search
CPC ............ G01J 2003/2826; G01J 3/0224; G01J 3/0229; G01J 3/0289; G01J 3/0297; G01J 3/2823
See application file for complete search history.

(56) References Cited

U.S. PATENT DOCUMENTS

| 5,790,188 A | 8/1998 | Sun et al. |
| 7,885,535 B2 | 2/2011 | Horowitz |

(Continued)

FOREIGN PATENT DOCUMENTS

| EP | 3720123 | 10/2020 |
| WO | 2012/148919 | 11/2012 |

(Continued)

OTHER PUBLICATIONS

Elad et al., Restoration of a Single Superresolution Image from Several Blurred, Noisy, and Undersampled Measured Images, IEEE Transactions on Image Processing, Dec. 1997, pp. 1646-1658, vol. 6, No. 12.

(Continued)

*Primary Examiner* — Hina F Ayub
(74) *Attorney, Agent, or Firm* — Kunzler Bean & Adamson

(57) ABSTRACT

An image capture apparatus comprises a focal plane array and a filter device. The focal plane array comprises a plurality of detectors and the filter device is coupled with and covering the focal plane array. The filter device comprises at least one set of spectral filters, comprising at least a first spectral filter, which comprising a first wavelength range, and a second spectral filter, which comprises a second wavelength range that is different from the first wavelength range. The filter device also comprises a plurality of polarization channels, each having a polarization value that is different than the polarization value of any other of the plurality of polarization channels. The filter device further comprises a plurality of sounding filters, each operable within a spectral wavelength range and each configured to determine a characterization of atmospheric conditions.

20 Claims, 10 Drawing Sheets

(51) Int. Cl.
*G01W 1/16* (2006.01)
*G01W 1/18* (2006.01)

(52) U.S. Cl.
CPC .......... *G01J 3/0289* (2013.01); *G01J 3/0297* (2013.01); *G01J 3/2823* (2013.01); *G01W 1/18* (2013.01); *G01J 2003/2826* (2013.01)

(56) References Cited

U.S. PATENT DOCUMENTS

| | | |
|---|---|---|
| 11,740,188 B2 | 8/2023 | Cao |
| 2006/0022121 A1 | 2/2006 | Tan et al. |
| 2011/0080487 A1 | 4/2011 | Venkataraman et al. |
| 2012/0293669 A1 | 11/2012 | Mann et al. |
| 2016/0011050 A1 | 1/2016 | Skauli |
| 2016/0269694 A1 | 9/2016 | Masuda et al. |
| 2017/0336322 A1 | 11/2017 | Morin et al. |
| 2019/0188827 A1 | 6/2019 | Mitani et al. |
| 2019/0346307 A1 | 11/2019 | Genier et al. |
| 2020/0256727 A1 | 8/2020 | Smith et al. |
| 2022/0196471 A1* | 6/2022 | Gerwe .................. G01J 3/2803 |
| 2022/0260340 A1 | 8/2022 | Choiniere |

FOREIGN PATENT DOCUMENTS

| | | |
|---|---|---|
| WO | 2015/169875 | 11/2015 |
| WO | 2018/102171 | 6/2018 |
| WO | 2020/167659 | 8/2020 |

OTHER PUBLICATIONS

Farsiu et al., Fast and Robust Multiframe Super Resolution, IEEE Transactions on Image Processing, Oct. 2004, pp. 1327-1344, vol. 13, No. 10.

Hardie et al., High-resolution image reconstruction from a sequence of rotated and translated frames and its application to an infrared imaging system, Optical Engineering, Jan. 1998, pp. 247-260, vol. 37, No. 1., Society of Photo-Optical Instrumentation Engineers.

Rogne et al., Passive target detection using polarized components of infrared signatures, SPIE, 1990, p. 242-251, vol. 1317.

U.S. Appl. No. 17/554,781, filed Dec. 17, 2021.

U.S. Appl. No. 17/742,220, filed May 11, 2022.

Extended European Search Report for EP Application No. 23170919.7 dated Sep. 20, 2023.

Jovanovic et al., "Automated Data 7,8,11 Production for a Novel Airborne Multiangle Spectropolarimetric Imager (AIRMSPI)", International Archives of the Photogrammetry, Remote Sensing and Spatial Information Sciences, Aug. 25-Sep. 1, 2012, pp. 33-38, vol. XXXIX-B1, XXII ISPRS Congress, Melbourne, Australia.

* cited by examiner

MULTI-SPECTRAL AND POLARIZATION IMAGING APPARATUS WITH ATMOSPHERIC SOUNDING FILTERS AND ASSOCIATED SYSTEM AND METHOD

FIELD

This disclosure relates generally to an image capture apparatus, and more particularly to an image capture apparatus with atmospheric sounding filters for generating multi-spectral and polarization composite images.

BACKGROUND

Imaging apparatuses using electro-optical sensors, which receive electromagnetic radiation signals from or reflected by an object, are used to determine one or more characteristics of the object. Multi-spectral sensors, which are one type of electro-optical sensor, capture images at different wavelengths. Polarization sensors, which are also another type of electro-optical sensor, divide received light in a captured image into different planes of polarization. Imaging apparatuses having multi-spectral sensors and/or polarization sensors are useful for imaging in many applications including, but not limited to, terrain classification, detecting specific ground-based materials/objects (e.g., minerals, paints, metals, vehicles, roads), and characterizing atmospheric conditions/objects (e.g., clouds, weather, climate).

Some imaging apparatuses, which include multiple sensors, are complex and expensive. For example, certain imaging apparatuses require separate cameras and/or optical beam splitters for each one of multiple spectral bands and/or polarization channels. Furthermore, modifying the generated images based on atmospheric conditions requires that data about atmospheric conditions are obtained during use of the image apparatus. Generally, imaging apparatus obtain atmospheric condition data using a separate dedicated sensor requiring additional hardware and software components, or providing a substantial portion of a focal plane surface for additional full swath spectral sounding measurements, which further increase the complexity, size, power, and expense of the imaging apparatus.

SUMMARY

The subject matter of the present application has been developed in response to the present state of the art, and in particular, in response to the problems of and needs created or not yet fully solved by conventional imaging apparatuses. Generally, the subject matter of the present application has been developed to provide image capture apparatuses, and associated systems and methods, that overcome at least some of the above-discussed shortcomings of prior art systems.

Disclosed herein is an image capture apparatus. The apparatus comprises a focal plane array comprising a plurality of detectors. The apparatus also comprises a filter device coupled with and covering the focal plane array. The filter device comprises at least one set of spectral filters, comprising at least a first spectral filter, which comprises a first wavelength range, and a second spectral filter, which comprises a second wavelength range that is different than the first wavelength range. The filter device also comprises a plurality of polarization channels, each having a polarization value that is different than the polarization value of any other of the plurality of polarization channels. The filter device further comprises a plurality of sounding filters, each operable within a spectral wavelength range and each configured to determine a characterization of atmospheric conditions. The preceding subject matter of this paragraph characterizes example 1 of the present disclosure.

The plurality of sounding filters are positioned along a plane that is parallel to a cross-scan direction of the filter device, which is parallel to the at least one set of spectral filters. The preceding subject matter of this paragraph characterizes example 2 of the present disclosure, wherein example 2 also includes the subject matter according to example 1, above.

The plurality of sounding filters are positioned along a leading edge of the filter device. The preceding subject matter of this paragraph characterizes example 3 of the present disclosure, wherein example 3 also includes the subject matter according to example 2, above.

The plurality of sounding filters are positioned along a side edge of the filter device, perpendicular to a leading edge of the filter device, and perpendicular to the at least one set of spectral filters. The preceding subject matter of this paragraph characterizes example 4 of the present disclosure, wherein example 4 also includes the subject matter according to any of examples 1-3, above.

One of the plurality of sounding filters corresponds with at least the first spectral filter, such that a plane, perpendicular to a scan direction, passes through the one of the plurality of sounding filters and the first spectral filter. The spectral wavelength range of the one of the plurality of sounding filters is inclusive of, and larger than, the first wavelength range of the first spectral filter. The preceding subject matter of this paragraph characterizes example 5 of the present disclosure, wherein example 5 also includes the subject matter according to example 4, above.

At least one of the plurality of sounding filters is positioned along a plane that is parallel to a cross-scan direction of the filter device, which is parallel to the at least one set of spectral filters. At least another one of the plurality of sounding filters is positioned along a plane that is parallel to a scan direction of the filter device, which is perpendicular to the at least one set of spectral filters. The preceding subject matter of this paragraph characterizes example 6 of the present disclosure, wherein example 6 also includes the subject matter according to any of examples 1-5, above.

The spectral wavelength range of the at least one of the plurality of sounding filters is the same as the spectral wavelength range of the at least another one of the plurality of sounding filters. The preceding subject matter of this paragraph characterizes example 7 of the present disclosure, wherein example 7 also includes the subject matter according to example 6, above.

A combined total outward—facing surface area of the plurality of sounding filters is less than ten percent of a total outward-facing surface area of the filter device. The preceding subject matter of this paragraph characterizes example 8 of the present disclosure, wherein example 8 also includes the subject matter according to any of examples 1-7, above.

The spectral wavelength range of at least one of the plurality of sounding filters is different than the spectral wavelength range of at least another one of the plurality of sounding filters. The preceding subject matter of this paragraph characterizes example 9 of the present disclosure, wherein example 9 also includes the subject matter according to any of examples 1-8, above.

The plurality of polarization channels includes at least three polarization channels. The preceding subject matter of this paragraph characterizes example 10 of the present disclosure, wherein example 10 also includes the subject matter according to any of examples 1-9, above.

The polarization value of each one of the polarization channels is chosen from a group consisting of a vertical polarization, a horizontal polarization, a positive 45-degree polarization, a negative 45-degree polarization, a left-hard circular polarization, and a right-hand circular polarization. The preceding subject matter of this paragraph characterizes example 11 of the present disclosure, wherein example 11 also includes the subject matter according to any of examples 1-10, above.

The first wavelength range is associated with a first color and the second wavelength range is associated with a second color that is different than the first color. The preceding subject matter of this paragraph characterizes example 12 of the present disclosure, wherein example 12 also includes the subject matter according to any of examples 1-11, above.

The filter device comprises at least four sets of spectral filters. The preceding subject matter of this paragraph characterizes example 13 of the present disclosure, wherein example 13 also includes the subject matter according to any of examples 1-12, above.

Further disclosed herein is an image capture system that comprises a focal plane array comprising a plurality of detectors. The image capture system also comprises a filter device coupled with and covering the focal plane array. The filter device comprises at least one set of spectral filters, comprising at least a first spectral filter, which comprises a first wavelength range, and a second spectral filter, which comprises a second wavelength range that is different than the first wavelength range. The filter device also comprises a plurality of polarization channels, each having a polarization value that is different than the polarization value of any other of the plurality of polarization channels. The filter device further comprises a plurality of sounding filters, each operable within a spectral wavelength range and each configured to determine a characterization of atmospheric conditions. The image capture system further comprises a controller communicatively coupled with the filter device and the focal plane array. The controller is configured to control the plurality of detectors of the focal plane array to capture a first image of an area when a capture-portion of the area is in a first linear alignment with the first spectral filter and a corresponding one of the plurality of detectors. The controller is also configured to control the plurality of detectors to capture a second image of the area when the capture-portion of the area is in a second linear alignment with the second spectral filter and a corresponding one of the plurality of detectors, the second linear alignment substantially similar to the first linear alignment. The controller is further configured to control the plurality of detectors to capture a third image of the area when the capture-portion of the area is in a third linear alignment with one of the plurality of polarization channels and a corresponding one of the plurality of detectors, the third linear alignment substantially similar to the first linear alignment. Additionally, the controller is configured to control the plurality of detectors to capture at least one atmospheric measurement of the area when the capture-portion of the area is in a fourth linear alignment with one of the plurality of sounding filters and a corresponding one of the plurality of detectors, the fourth linear alignment substantially similar to the first linear alignment. The controller is also configured to calibrate the first image, the second image and the third image, using the atmospheric measurement, to generate a calibrated first image, a calibrated second image, and a calibrated third image. The controller is further configured to generate a multi-spectral and polarization composite image using at least the calibrated first image, the calibrated second image, and the calibrated third image. The preceding subject matter of this paragraph characterizes example 14 of the present disclosure.

The first image, the second image, and the third image are calibrated in real-time, as the first image, the second image, and the third image are captured. The preceding subject matter of this paragraph characterizes example 15 of the present disclosure, wherein example 15 also includes the subject matter according to example 14, above.

Alternatively, the first image, the second image, and the third image are calibrated at a time after the first image, the second image, and the third image are captured. The preceding subject matter of this paragraph characterizes example 16 of the present disclosure, wherein example 16 also includes the subject matter according to example 14, above.

The filter device is fixed to the focal plane array, such that the filter device does not move relative to the focal plane array. The controller is further configured to control adjustment of the position of the focal plane array, relative to the capture-portion of the area, to generate the second linear alignment, the third linear alignment, and the fourth linear alignment, with the capture-portion of the area. The preceding subject matter of this paragraph characterizes example 17 of the present disclosure, wherein example 17 also includes the subject matter according to any of examples 14-16, above.

Further disclosed herein is a method of capturing image data. The method comprises the step of capturing, with an image capture apparatus, a first image of an area when a capture-portion of the area is in a first linear alignment with a first spectral filter of a filter device and a corresponding one of a plurality of detectors of a focal plane array. The filter device is coupled to the focal plane array. The method also comprises the step of capturing, with the image capture apparatus, a second image of the area when the capture-portion of the area is in a second linear alignment with a second spectral filter of the filter device and a corresponding one of the plurality of detectors. The second linear alignment substantially similar to the first linear alignment. The method further comprises the step of capturing, with the image capture apparatus, a third image of the area when the capture-portion of the area is in a third linear alignment with one of a plurality of polarization channels and a corresponding one of the plurality of detectors. The third linear alignment substantially similar to the first linear alignment. The method also comprises the step of capturing, with the image capture apparatus, at least one atmospheric measurement of the area when the capture-portion of the area is in a fourth linear alignment with one of a plurality of sounding filters and a corresponding one of the plurality of detectors. The fourth linear alignment substantially similar to the first linear alignment. The method further comprises the step of calibrating the first image, the second image, and the third image, using the at least one atmospheric measurement, to generate a calibrated first image, a calibrated second image, and a calibrated third image. Additionally, the method further comprises generating a multi-spectral and polarization composite image using at least the calibrated first image, the calibrated second image, and the calibrated third image. The preceding subject matter of this paragraph characterizes example 18 of the present disclosure.

The step of calibrating the first image, the second image, and the third image, using the at least one atmospheric measurement, further comprises calibrating the first image, the second image, and the third image, in real time, as the first image, the second image, and the third image are captured. The preceding subject matter of this paragraph characterizes example 19 of the present disclosure, wherein example 19 also includes the subject matter according to example 18, above.

Alternatively, the step of calibrating the first image, the second image, and the third image using the at least one atmospheric measurement further comprises calibrating the first image, the second image, and the third image at a time after the first image, the second image, and the third image are captured. The preceding subject matter of this paragraph characterizes example 20 of the present disclosure, wherein example 20 also includes the subject matter according to example 18, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
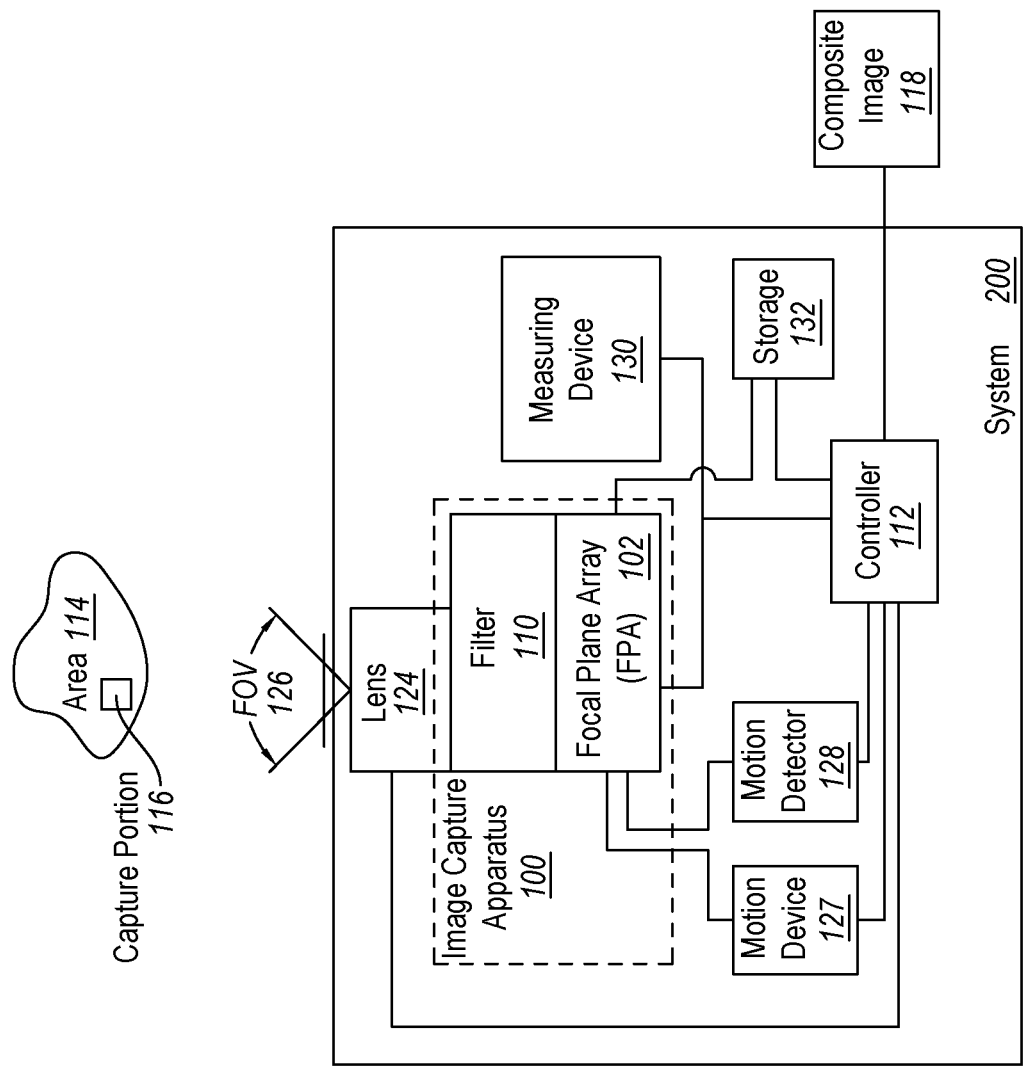
FIG. 1 is a schematic block view of an image capture system, according to one or more examples of the present disclosure.

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein is an image capture apparatus and system that includes a focal plane array and a filter device, which can include multi-spectral filters (e.g., bandpass filters), polarization channels and atmospheric sounding filters. The image capture apparatus is configured to capture images in multiple spectral wavelengths and polarizations, as well as, to capture an atmospheric measurement or measurements. The image capture apparatus is helpful in cases where images of objects are captured from a distance (e.g., captured from a space or air platform) as the multi-spectral filters and polarization channels can be used to generate high-resolution images. For example, the image capture apparatus can be useful for terrain classification, detecting specific ground-based materials/objects (e.g., minerals, paints, metals, vehicles, roads), and characterizing atmospheric conditions/objects (e.g., clouds, weather, climate), especially when imaging from a distance. The image capture apparatus, disclosed herein, has reduced hardware and complexity, compared to conventional imaging apparatus, as the multiple spectral wavelengths and polarizations, as well as, the atmospheric sounding filters, are combined into a simplified filter device and focal plane array.

Using the image capture apparatus and system, movement of the filter device, the focal plane array, or both, is controlled to capture different images that have substantially similar linear alignments to a capture-portion within an area using different spectral filters, polarization channels and sounding filters. In other words, each image is captured when the filter, capturing the image, is in approximately the same position, relative to a specific location within the area. As used herein, linear alignment refers to the linear arrangement and orientation between a specific filter on the focal point array and the capture-area (i.e., specific location) within an area being imaged. In some cases, movement of the filter device and/or focal plane array is tracked, such as tracking the movement of individual components of the image capture apparatus or tracking the movement of a platform (e.g., an aircraft or satellite) on which the image capture apparatus is coupled. Based on the tracked movement, image capture timing can be determined, so that detectors corresponding to one location in the filter device capture nearly the same capture-portion at a first linear alignment as detectors corresponding to other locations in the filter device at a substantially similar linear alignment. Images, of nearly the same capture-portion of the area captured with detectors corresponding to different spectral filters or polarization channels, are saved and used to generate a composite image. Nonconforming images (e.g., images determined to not have detectors capturing nearly the same capture-portion of the area) are discarded and therefore not included in the composite image.

Improved resolution of the generated composite image is realized by capturing multiple images having a substantially similar linear alignment between the capture-portion and detectors of a focal plane array. The multiple images are generated using different filter configurations, such that a particular feature in the capture-portion is captured though different filters in the multiple images. As an example, a feature that is centered in an instantaneous field of view of a detector is captured by the detector, corresponding with a first spectral filter, and the same feature is also captured by detectors corresponding to other spectral filters or polarization channels. As a result, a relatively large number of images having similar linear alignments with respect to detectors of the focal plane array and the capture-area, but different filters can be captured and processed to increase the resolution of the composite image. Furthermore, capturing images by detectors corresponding to different planes of polarization provides data that can be processed to form images that convey specific polarization attributes that result in man-made objects "popping out" against natural background in the captured image because man-made material tends to polarize light more strongly than natural material. A common example of this are degree-of-linear polarization (DOLP) images.

The image capture apparatus also efficiently provides additional spectral measurements to facilitate atmospheric characterization and compensation measurements (i.e., atmospheric measurements), while avoiding the need for a separate dedicated sensor. Composite images can be calibrated, using the atmospheric characterization and compensation measurements, to either remove any fluctuation from attenuation in the atmosphere which results in composite images that have been calibrated to remove the effects of the atmosphere (e.g., colorization) or to normalize (i.e., re-calibrate) the composite images to be consistent with some standard atmosphere conditions. This facilitates comparison between different composite images taken at different times and/or under different atmospheric conditions. In other words, after the captured images are calibrated with the atmospheric characterization and compensation measurements, the data is in radiometric units of the radiance emanating from the captured-area, before the modifications from propagating through the atmosphere to the image capture apparatus. Furthermore, the calibrated images can facilitate interpretation of the composite images, and/or the application of further processing steps, with less sensitivity to the influence of variability in atmospheric conditions. This is valuable in comparing composite images measured under different atmospheric conditions and can simplify the interpretation of the composite image data or the during the use of the composite image in later processing steps. In other cases, the atmospheric characterization and compensation measurements may not be used to calibrate the composite image, but provides meta-information used for interpretation and use of the composite image data.

Referring to FIG. 1, an image capture system 200, including an image capture apparatus 100, is shown. The image capture system 200 enables generation of multiple images of an area in multiple spectral wavelengths or polarizations, without the need for complex optics or multiple focal plane arrays. The image capture apparatus 100 includes a filter device 110 (e.g., filter) coupled with and covering a portion of a focal plane array 102, which includes a plurality of detectors 108 (see, e.g., FIG. 2). The image capture apparatus 100 can include, but is not limited to, a video camera, a picture camera, a thermal imaging camera, a microwave imager, or a radiation detector. The filter device 110 is coupled with the focal plane array 102. The filter device 110 includes multiple spectral filters and polarization channels that are configured to interpose one or more filters between an area 114 and one or more detectors 108 of the focal plane array 102. Accordingly, the filter device 110 is positioned between the plurality of detectors 108 and the area 114 being imaged.

The image capture system 200 additionally includes a controller 112 that is communicatively coupled with the filter device 110 and the focal plane array 102. The controller 112 is configured to control and communicate with the plurality of detectors 108 of the focal plane array 102. As a linear alignment between a detector 108 of the focal plane array 102 and a capture-portion 116 (e.g., a specific portion of the area 114 used to perform the linear alignment techniques described herein) is changed, such as when the image capture apparatus 100 is moved, the controller 112 is configured to capture images of the area 114 with at least one of the plurality of detectors 108. Using the images obtained from the plurality of detectors 108, the controller 112 is configured to generate a composite image 118, such as a multi-spectral and multi-polarization composite image 118. Additionally, using the image(s) obtained from the plurality of detectors 108 corresponding to sounding filters, the controller 112 is configured to generate at least one atmospheric measurement.

In some examples, a measuring device 130, in communication with the controller 112, tracks the movement of the focal plane array 102 relative to the capture-portion 116. In other words, as the linear alignment of the focal plane array 102 is adjusted, the measuring device 130 tracks the movement and relays to the controller 112 when one the plurality of detectors 108 of the focal plane array 102 has the necessary linear alignment to capture an image of the area 114. Alternatively, or additionally, the measuring device 130, in communication with the controller 112, tracks the movement of the filter device 110 relative to the capture-portion 116. That is, as the linear alignment of the filter device 110 is adjusted, the measuring device 130 tracks the movement and relays to the controller 112 when one of the spectral filters, polarization channels, or sounding filters has the necessary linear alignment to capture an image of the area 114.

The image capture system 200 also includes imaging optics, such as a lens system 124, telescope, or other optics, that direct light, from the area 114, towards the focal plane array 102. The term lens system will be used herein generally to refer to the imaging optics, which may be composed of a variety of types of elements used to capture light and focus it into an image onto the focal-plane array, where the elements may include but are not limited to refractive lens elements, reflective mirrors, Fresnel lenses, holographic elements, and gradient index of refraction (GRIN) elements. The lens system 124 has a field of view 126 that is directed towards the area 114. Moreover, the field of view 126 of the area 114 includes the capture-portion 116, which is detectable by the image capture apparatus 100. Accordingly, the field of view 126 of the lens system 124 permits the area 114 to be imaged with the capture-portion 116 within the resulting image. In some examples, the movement of the lens system 124 can be directed and tracked by a motion device 127 configured to move and direct the lens system 124 in a direction towards the area 114 and a motion detector 128 configured to measure the motion of the lens system 124, both of which are communicatively coupled with the controller 112.

The system 200 may also include storage 132 (e.g., a digital data storage device), such as a memory device, that is configured to store the images captured by the image capture apparatus 100.

In some examples, the controller 112 is communicatively connected to the filter device 110, focal plane array 102, the lens system 124, the motion device 127, the motion detector 128, the measuring device 130, and the storage 132. The controller 112 is described as being communicatively connected with other components. Communicatively connected refers to any type of communication and/or connection between the components that allows the component to pass and/or receive signals and/or information from another component. The communication may be along any signal path, whether a wired or a wireless connection. The controller 112 may include, or be part of, a computing device that may include one or more processors, memory, and one or more communication interfaces.

Figure 2:
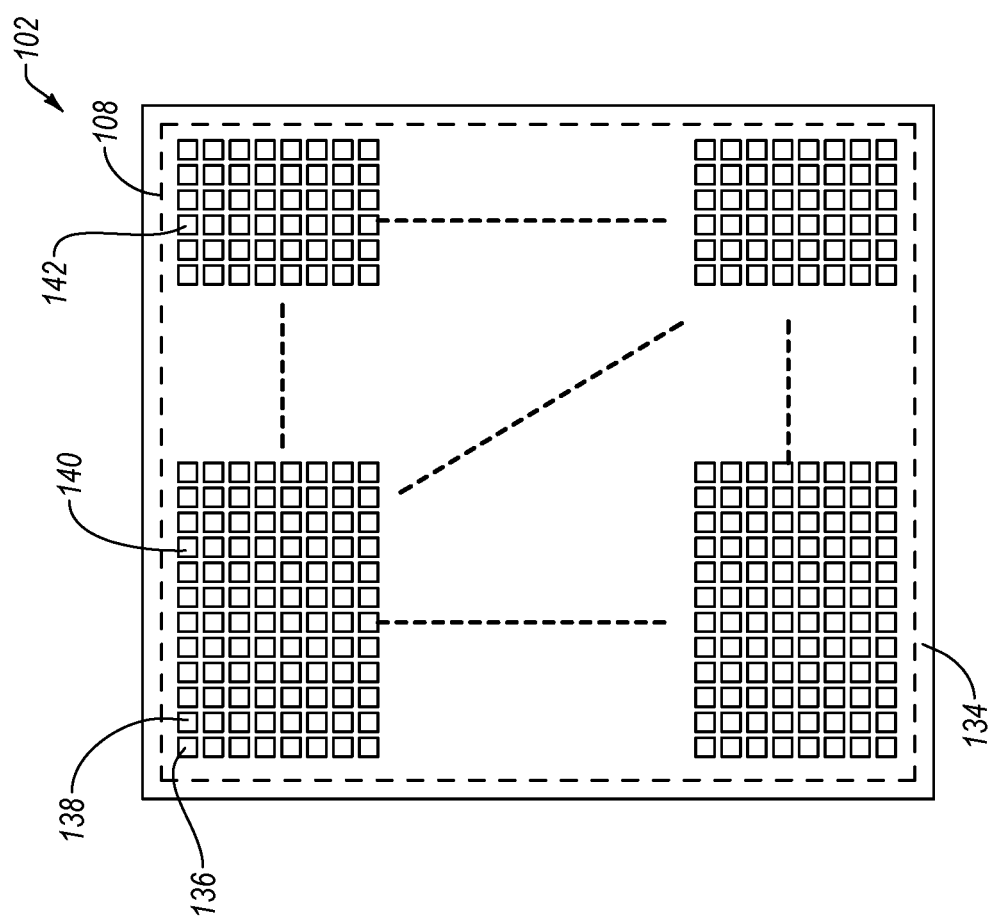
FIG. 2 is a schematic top plan view of a focal plane array, according to one or more examples of the present disclosure.

A top plan view of a focal plane array 102 is shown in FIG. 2. The focal plane array 102 includes a plurality of detectors 108 along a surface 134 of the focal plane array 102. The plurality of detectors 108 (e.g., in a rectangular array, a hexagonal array, or another regular or irregular arrangement of detectors) are configured to measure an intensity of received electromagnetic radiation and positioned to receive an image of an area of interest, such as at a focal plane of the image capture apparatus 100. The focal plane array 102 can include any of various amounts of detectors 108 along the surface 134, depending on the application and needs of the image capture apparatus 100. In some examples, the focal plane array 102 may be small with a small number of detectors 108, such as approximately 256 detectors. In other examples, the focal plane array 102 may be large with a large number of detectors 108, such as over 10,000 detectors. Accordingly, the focal plane array 102 is sized to correspond with the number of detectors of the plurality of detectors 108.

Some of the plurality of detectors 108 are associated with spectral filters, such as, in some examples, a first detector 136 and a second detector 138. Others of the plurality of detectors 108 are associated with polarization channels, such as, in some examples, a third detector 140. While others of the plurality of detectors 108 are associated with sounding filters, such as, in some examples, a fourth detector 142. The spacing between the plurality of detectors 108 can be uniform or non-uniform. In some examples, the plurality of detectors 108 are uniformly spaced apart from others of the plurality. In other examples, the plurality of detectors 108 may have non-uniform spacing, such as the spacing corresponding to the spectral filters may have a different spacing between adjacent detectors than the plurality of detectors 108 corresponding to the sounding filters.

Figure 3:
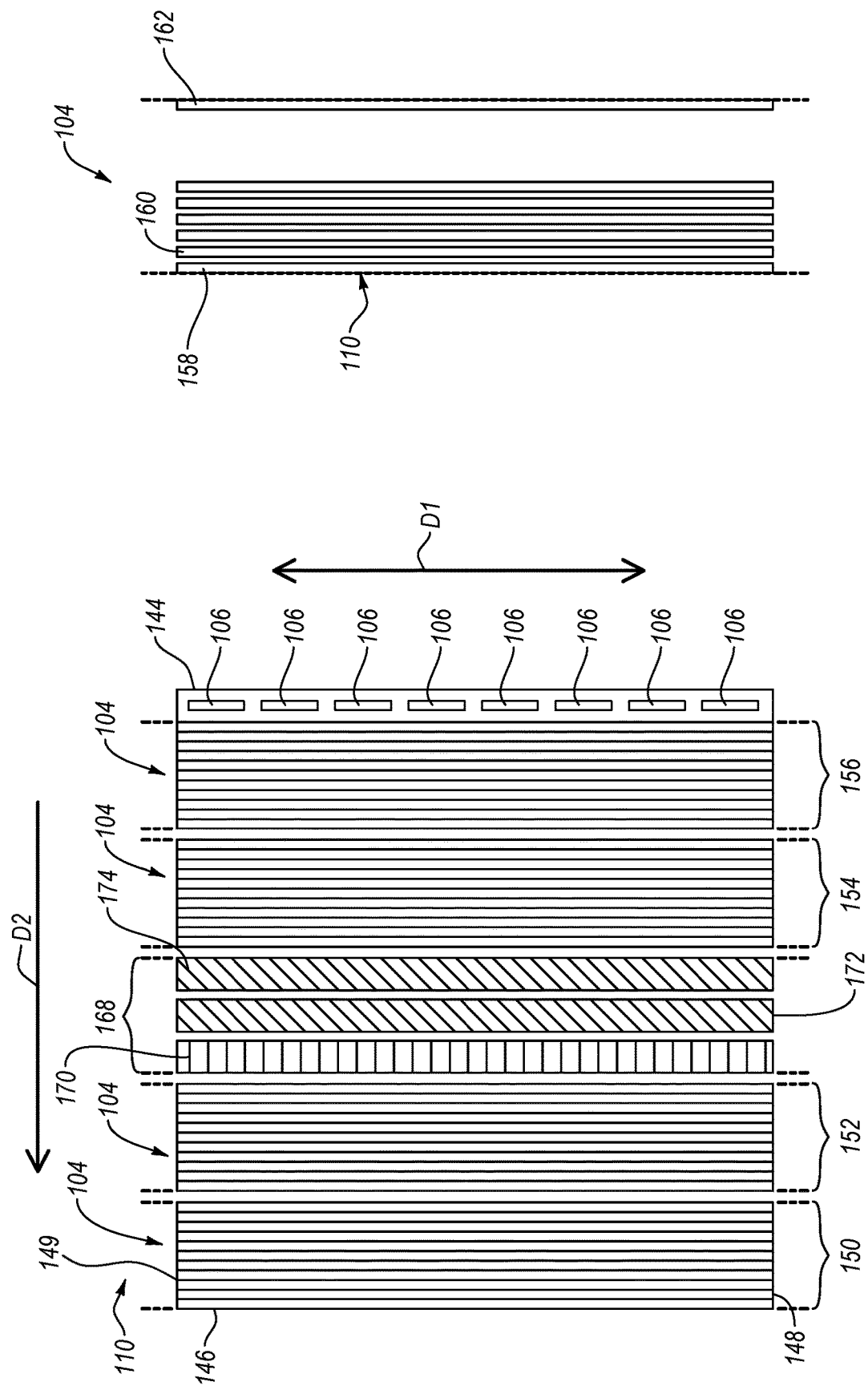
FIG. 3A is a schematic top plan view of a multi-spectral and multi-polarization filter device with sounding filters, according to one or more examples of the present disclosure.
FIG. 3B is a schematic top plan view of a butcher block type of spectral filter of the filter device shown in FIG. 3A, according to one or more examples of the present disclosure.

Referring to FIG. 3A, a top plan view of a filter device 110 is shown. The filter device 110 includes a plurality of spectral filters including at least a first spectral filter and a second spectral filter. In some examples, the filter device 110 is further arranged into multiple sets of spectral filters (e.g., butcher block type of spectral filters), each set of spectral filters having a repeating pattern of spectral filters, including at least the first spectral filter and the second spectral filter. As shown, the filter device 110 includes four sets of spectral filters including a first set of spectral filters 150, a second set of spectral filters 152, a third set of spectral filters 154, and a fourth set of spectral filters 156. However, the filter device 110 could include any number of sets of spectral filters.

A set of spectral filters, such as the first set of spectral filters 150, is shown in FIG. 3B. For example, the first set of spectral filters 150 can include a plurality of spectral filters that include the first spectral filter 158, the second spectral filter 160, through an Nth spectral filter 162, where N may be equal to any number based on the design of the filter device 110. Each spectral filter is configured to pass electromagnetic radiation having wavelengths within a specific wavelength range (e.g., passband) and to block electromagnetic radiation having wavelengths outside the specific wavelength range. For example, the specific wavelength range may vary from an infrared wavelength, a visible wavelength, to an ultraviolet wavelength. The first spectral filter 158 has a first wavelength range and the second spectral filter 160 has a second wavelength range that is different from the first wavelength range. In other words, in some examples, the first wavelength range is associated with a first color and the second wavelength range is associated with a second color. Likewise, the Nth spectral filter 162 has a wavelength range that is different from the first wavelength range and the second wavelength range. The set of spectral filters can be used to acquire measurements that can be used to produce a composite image with layers corresponding to different spectral filters (i.e., an image hypercube). An image hypercube is a data array in which two dimensions are spatial (i.e., scan direction and cross-scan direction) and a third dimension provides layers corresponding to different spectral filters and/or polarizations. Moreover, by repeatably capturing images of an area to produce the image hypercube, the filter device 110 is capable of detecting moving targets or images in the area 114 by subtracting the produced images to determine what is different in other images of the area 114.

As shown in FIG. 3A, in some examples, the filter device 110 also includes at least one polarization channel or a plurality of polarization channels 168, which includes a first polarization channel 170, a second polarization channel 172, and a third polarization channel 174 in the illustrated example. In some examples, the plurality of polarization channels 168 may include but is not limited to, a vertical polarization channel, a horizontal polarization channel, a positive 45-degree polarization channel, a negative 45-degree polarization channel, a left-hand circular polarization channel, a right-hand circular polarization channel, or polarization channels with alternative linear polarizations. In some examples, the filter device 110 includes at least three polarization channels 168. Appropriate processing of the at least three polarization channels 168 can produce a DOLP image that makes man-made objects "pop out" against the natural background.

The filter device 110 additionally includes a plurality of sounding filters 106. Each one of the sounding filters 106 is operable within a spectral wavelength range and is configured to determine a characterization of atmospheric conditions, such as water content, ozone, aerosols, $CO_2$, etc. in the atmosphere at a time when the filter device 110 is in use. Additionally, the plurality of sounding filters 106, in some examples characterize the spatial variations in atmospheric conditions across the area of the composite image.

The plurality of sounding filters 106 are positioned along a plane that is parallel to a cross-scan direction D1 of the filter device 110. That is, the plurality of sounding filters 106 are positioned parallel to the at least one set of spectral filters 104 of the filter device 110. In some examples, as shown in FIG. 3A, the plurality of sounding filters 106 are positioned along a leading edge 144 of the filter device 110. By having the plurality of sounding filters 106 positioned along the leading edge 144, when the filter device 110 is in use and scanning in a scan direction D2, the plurality of sounding filters 106 provide immediate measurements of the atmospheric conditions before any images are obtained by the set of spectral filters 104 or polarization channels 168. Accordingly, the measurements from the sounding filters 106 can be used to calibrate the images obtained by the set of spectral filters 104 or polarization channels 168 in real-time. Additionally, each one of the plurality of sounding filters 106 scans over the same segment of an area, when the filter device 110 is in use, which helps in the relative calibration of measurements in each one of the plurality of sounding filters 106. In other examples, not shown, the plurality of sounding filters 106 can be positioned along the trailing edge 146 of the filter device 110, or at some other position between the leading edge 144 and the trailing edge 146.

Figure 4:
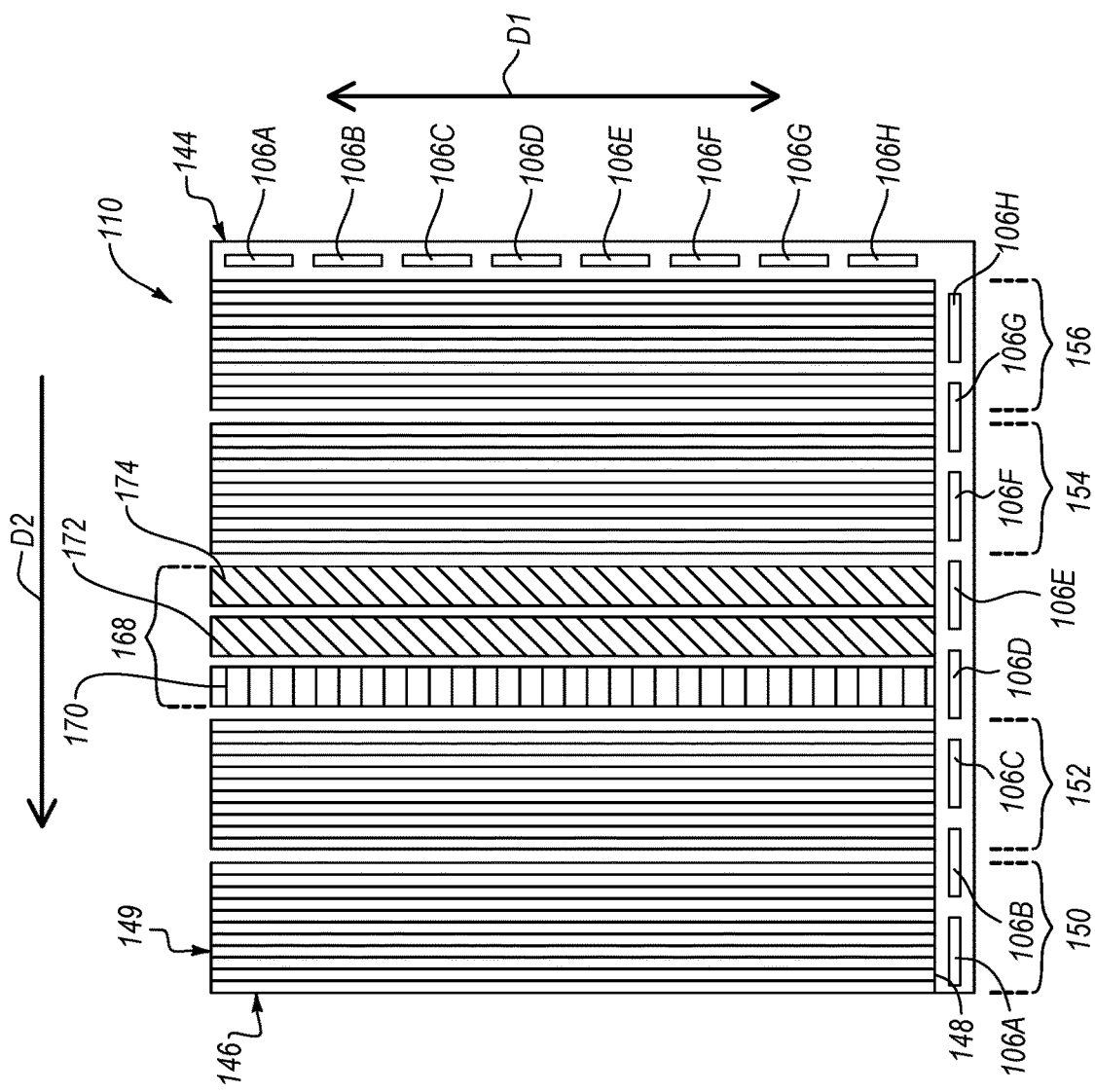
FIG. 4 is a schematic top plan view of another multi-spectral and multi-polarization filter device with sounding filters, according to one or more examples of the present disclosure.

Another example of the positions of the plurality of sounding filters 106 on the filter device 110 is shown in FIG. 4. The filter device 110 has the plurality of sounding filters 106 positioned along the leading edge 144, as well as, positioned along a side edge 148, perpendicular to the leading edge 144. In other words, the plurality of sounding filters 106 positioned along the side edge 148 are perpendicular to the at least one set of spectral filters 104. When the filter device 110 is in use and scanning in a scan direction D2, the plurality of sounding filters 106 positioned along the leading edge 144 provide immediate measurements of the atmospheric conditions before any images are obtained by the set of spectral filters 104 or polarization channels 168. The plurality of sounding filters 106 positioned along the side edge 148 provide measurements of the atmospheric conditions simultaneously as images are obtained by the corresponding one of the sets of spectral filters 104 or one of the plurality of polarization channels 168. In some examples, one of the plurality of sounding filters 106 corresponds with at least the first spectral filter 158, such that a plane, perpendicular to the scan direction D2, passes through the one of the plurality of sounding filters 106 and the first spectral filter 158. In other words, the one of the plurality of sounding filters 106 is aligned with the first spectral filter 158, such that images taken with the one of the plurality of sounding filters 106 and the first spectral 158 correspond in time to each other. In some examples, the spectral wavelength range of the one of the plurality of sounding filters 106 is inclusive of, and larger than, the first wavelength range of the first spectral filter 158.

Figure 5:
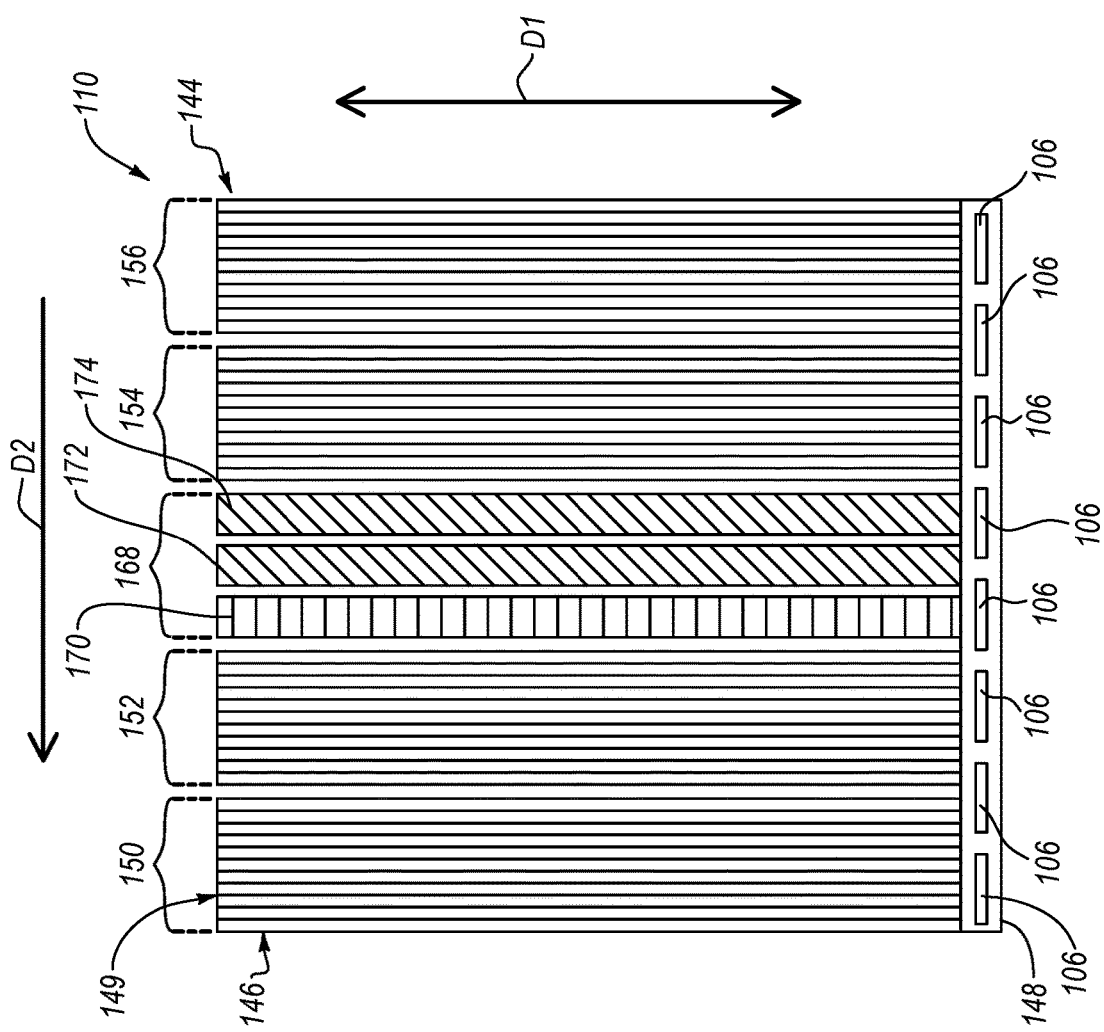
FIG. 5 is a schematic top plan view of yet another multi-spectral and multi-polarization filter device with sounding filters, according to another one or more examples of the present disclosure.

Yet another example of the position of the plurality of sounding filters 106 on the filter device 110 is shown in FIG. 5. The filter device 110 has the plurality of sounding filters 106 positioned along the side edge 148, perpendicular to the leading edge 144. Therefore, the plurality of sounding filters 106 provide measurements of the atmospheric conditions simultaneously as images are obtained by the corresponding one of the set of spectral filters 104 or one of the plurality of polarization channels 168. The plurality of sounding filters 106 could also be positioned on the filter device 110 in other configurations, such as along the side edge 148 and along the side edge 149, or along the leading edge 144 and along the trailing edge 146. Regardless of where the plurality of sounding filters 106 are positioned, in some examples, the combined total outward-facing surface area of the plurality of sounding filters 106 is less than twenty percent of a total outward-facing surface area of the filter device 110. In other examples, the combined total outward-facing surface area of the plurality of sounding filters 106 is less than ten percent of a total outward-facing surface area of the filter device 110.

The plurality of sounding filters 106 can include any number of sounding filters. In some examples, the preferred number of sounding filters and their specific spectral bandpasses may depend on the size and/or resolution of the filter device 110. Additionally, or alternatively, the preferred number of sounding filters 106 may also depend on the spectral range covered by the spectral filters (e.g. visible, near-infrared, mid-wave infrared, long-wave infrared, or combination of these), the specific atmospheric attributes to be characterized (e.g. temperature profile, pressure profile, and profiles of various atmospheric constituents such as water vapor, CO2, and aerosols), and the specific application area such as environmental monitoring, agriculture monitoring, mineral characterization, defense related, terrain characterization, or detection of specific materials or man-made object. In some examples, the plurality of sounding filters 106 includes at least two sounding filters. In other examples, the plurality of sounding filter includes at least sixteen sounding filters, such as shown in FIG. 4. Additionally, in some examples, one or more of the plurality of sounding filters have the same spectral wavelength range as another one of the plurality of sounding filters 106. For example, in some cases the sounding filter 106A positioned along the leading edge 144 has the same spectral wavelength range as the sounding filter 106A positioned along the side edge 148. Likewise, in some cases, the sounding filters 106B-106H positioned along the leading edge 144 each have the same spectral wavelength range as the corresponding sounding filters 106B-106H positioned along the side edge 148.

In some examples, the spectral wavelength ranges of the set of spectral filters 104 is selected to optimize detection of spectral features of an area, such as terrain, materials, objects or object characteristics relevant to an objective, such as specific paints, man-made materials, vegetation or mineral types, etc. The spectral wavelength ranges the plurality of sounding filters 106 are selected for the purpose of characterizing atmospheric properties during use of the filter device 110. Each one of the plurality of sounding filters 106 has a specific spectral wavelength range, with a starting wavelength and an ending wavelength. In some examples, the specific wavelength range is individually chosen for each one of the plurality of sounding filters 106 based on the use case of the filter device 110 and/or for atmospheric characterization purposes.

Figure 6:
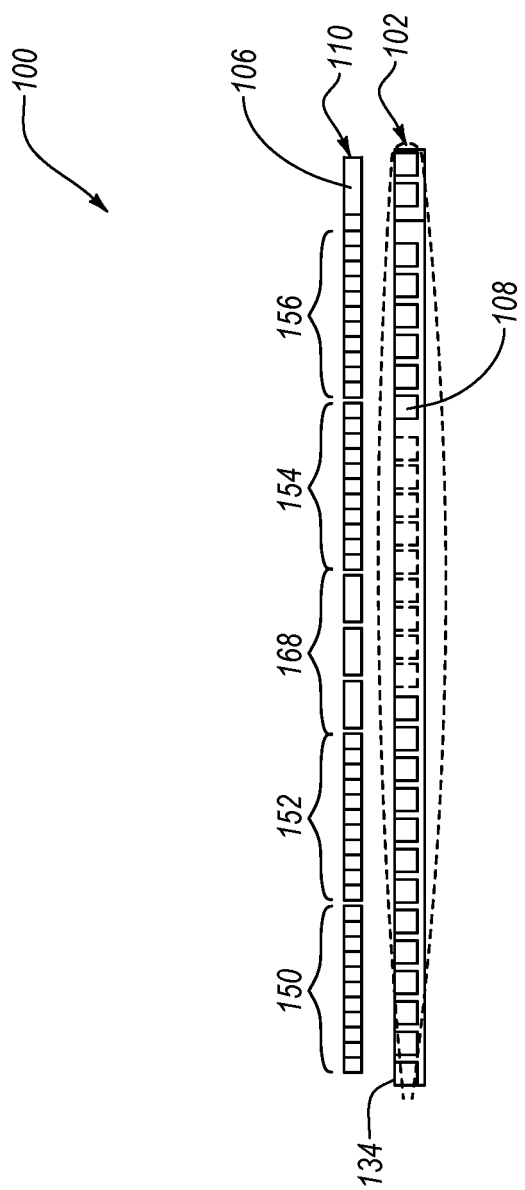
FIG. 6 is a schematic, sectional, side elevation view of a focal point array, and a multi-spectral and multi-polarization filter device with sounding filters, according to one or more examples of the present disclosure.

A sectional side elevation view of the image capture apparatus 100 is shown in FIG. 6. The focal plane array 102 is coupled with the filter device 110, and the plurality of detectors 108 are spaced along the entirety of the focal plane array 102. Accordingly, while imaging an area, the filter device 110 is interposed between the plurality of detectors 108 and the area 114 (see, e.g., FIG. 1).

Figure 7:
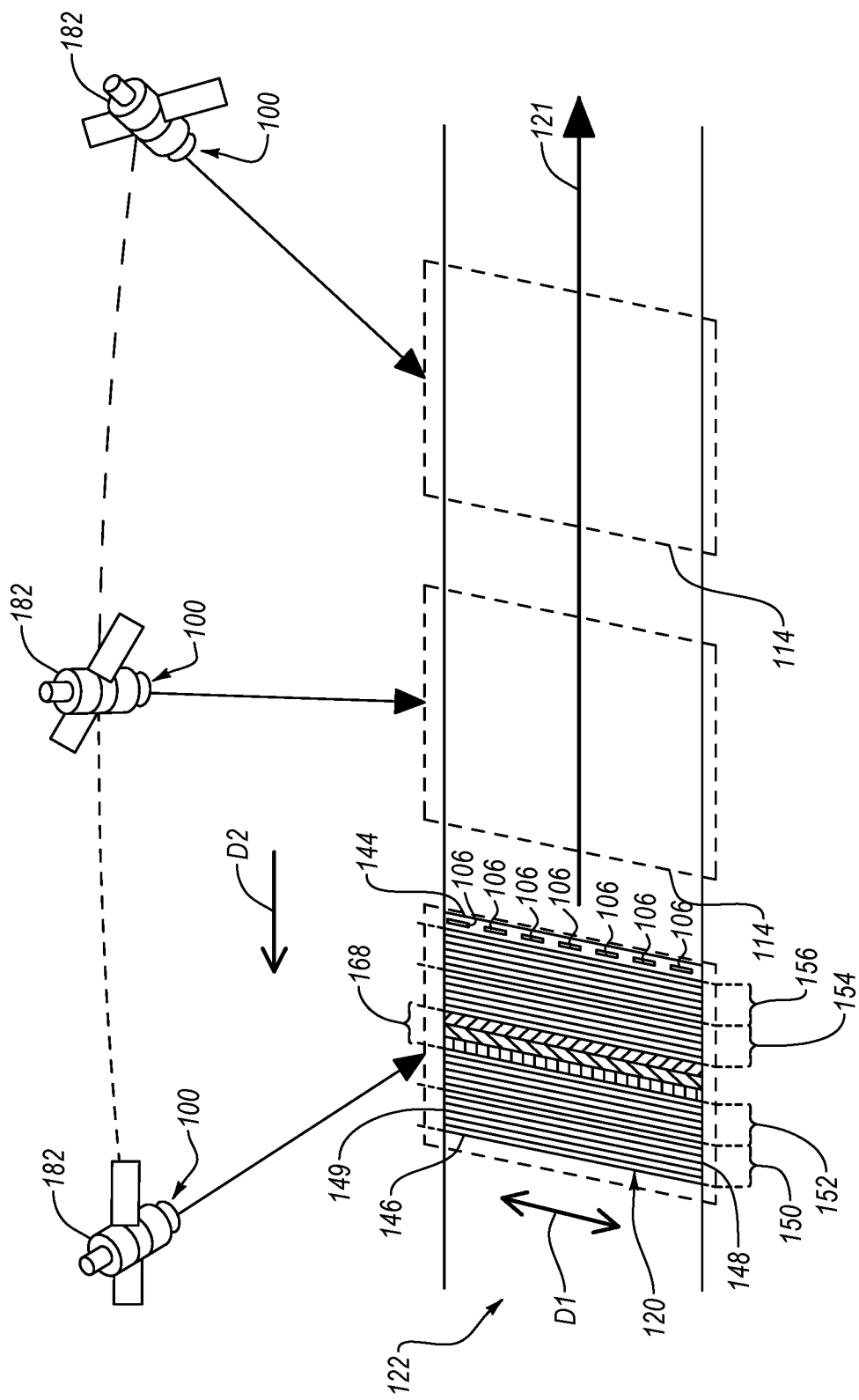
FIG. 7 is a schematic perspective view of satellite with an imaging apparatus having a multi-spectral and multi-polarization filter device with sounding filters, according to one or more examples of the present disclosure.

The image capture apparatus 100 may be coupled with a movable platform or device, such as an aerial vehicle (e.g., satellite, spacecraft, or aircraft) or ground vehicle. Referring to FIG. 7, the image capture apparatus 100 forms part of a satellite 182 and is used to image an area 114 (e.g., landmass) on earth. Additionally, in other examples, the image capture apparatus 100 can also be used to image space objects, including but not limited to, planets, asteroid, or man-made space objects such as satellites, rocket bodies, or extra-solar objects. The image capture apparatus 100 is used to scan its field-of-view (FOV) across a scene (e.g., a portion of landmass). The scan path is aligned to one axis of the focal plane array 102. For example, the scan path can be aligned with a scan direction D2, or a cross-scan direction D1, in the case of a rectangular focal plane array.

As shown, the satellite 182 moves along a scan path 121, which can be a generally straight scan path, approximately parallel with the scan direction D2, with a constant velocity and constant altitude, over a landmass while imaging an area 114 within the landmass. The scan starts at a leading edge 144 of the focal plane array 102, and ends at the edge opposite the leading edge 144, the trailing edge 146. The image capture apparatus 100, coupled with the satellite 182 and remote from the area 114, is configured to capture images of the area 114. In one example, the image capture apparatus 100 has a field of view that is swept across the landmass from the satellite 182 in a "push-broom" style while a sequence of individual images are collected from the area 114 (see, e.g., FIGS. 8A-8D). Alternatively, rather than sweeping the field of view 126 across the landmass in the push-broom style, the line of sight of the field of view may be mechanically or electronically moved by adjusting the location of the focal plane array 102, the filter device 110 or the lens system 124. The image capture apparatus 100 scans in the scan direction D2, such that scanning begins at the leading edge 144 of the filter device 110 and ends at the trailing edge 146 of the filter device 110. By way of illustration, a representative filter 120 (e.g., illustrative filter that represents the filter device 110) is shown on the ground 122, to illustrate how the filter device scans as the image capture apparatus 100 images the area 144. In some examples, the orientation or angle of the image capture apparatus 100 can be adjusted, so the focal plane array 102 is approximately parallel to the scan path 121 during operation.

In operation, according to one example, each ground point in the area 114 is measured N times at each pixel as the field of view 126 of the lens system 124 moves across the area 114 of the landmass at approximately one ground sampling distance (i.e., GSD) for each exposure of the image capture apparatus 100, where N is approximately equal to the number of pixels divided by the number of filters plus any buffers. In other examples of operation, the translation of the focal plane array 102 between consecutive image captures may be a fraction of the detector spacing (i.e., less than a pixel), or several pixel spacings, but less than the width of any of the spectral or polarization filters. Accordingly, the translation of the focal plane array 102 is not more than the width of the smallest filter (e.g., spectral, polarization, or sounding) to ensure that every point in the area 114 will be imaged using every filter on the image capture apparatus 100. Stated differently, for every point in the 114 area a composite image will be formed with a layer corresponding to each of the sets of spectral filters 104 and plurality of polarization channels 168, the composite image including images measured one or more times through each different set of spectral filters 104 and plurality of polarization channel 168. This ensures that each spatial pixel location in the resulting composite image has a measurement of the corresponding location in the area 144 for each set of spectral filters 104 and the plurality of polarization channel 168.

The received raw images generated from the area 114, are co-added to build a hypercube (i.e., spectral image cube). In general, the co-adding of raw images increase the contrast-to-noise ratio by a factor of the square root of N and suppresses any spatial non-uniformity residual noise (i.e., undesired variability in the background level and signal response in the detectors across the focal plane array). Additionally, this process can be repeated multiple times at each ground point in the area 114. As shown in FIG. 7, for illustration purposes only, the representative filter 120 is shown displayed on the ground 122 (e.g., earth landmass) at a first image capture, middle image capture, and last image capture as the image capture apparatus 100 translates linearly across the ground 122 along the scan path 121. In a typical image capture sequence, many images (e.g., dozens, hundreds, or thousands) can be captured between the first image capture and last image capture of the image capture sequence. During operation, the set of spectral filters 104 and plurality of polarization channels 168 passes over the ground 122, so that the area 114 gets measured by each one of the sets of spectral filters 104 and each one of the plurality of polarization channels 168. In some examples, the time between the image captures is no longer than the width of the smallest filter (e.g., spectral filter, polarization channel, or sounding filter) such that the area 114 is imaged at least one time by a detector aligned with every filter.

Figure 8A:
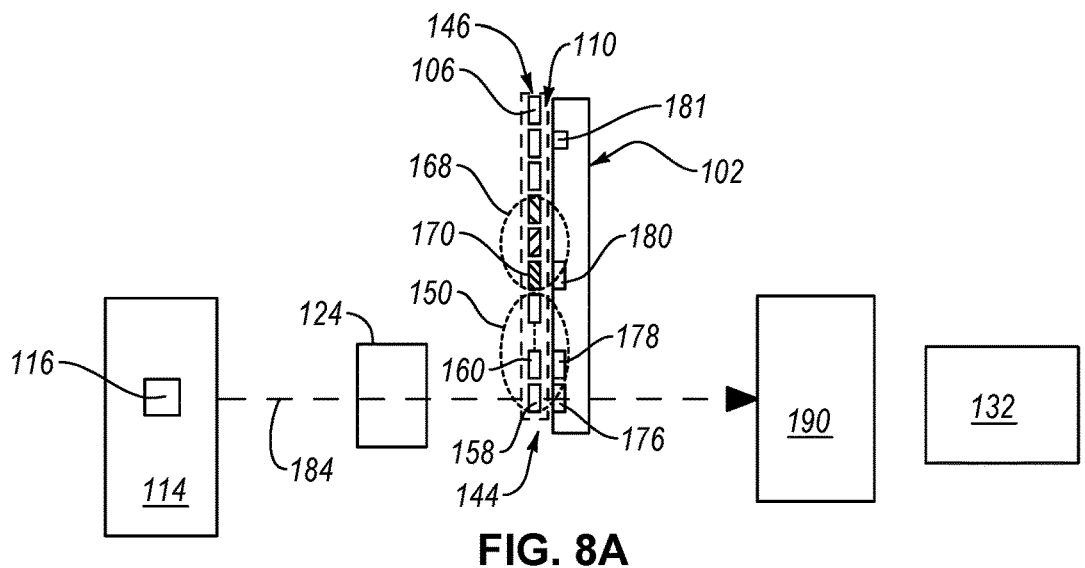
FIG. 8A is a schematic block diagram of a first linear alignment between a capture area and a first detector of the focal plane array, according to one or more examples of the present disclosure.

Referring to FIG. 8A, a block diagram of an example of a first linear alignment 184 between the capture-portion 116 of the area 114 and a first detector 176 of the focal plane array 102 is shown. The capture-portion 116 is aligned with the first detector 176 and the first spectral filter 158 of the filter device 110 to produce the first image 190 that is stored in the storage 132. For example, a line indicative of the first linear alignment 184 intersects the capture-portion 116 of the area 114, the lens system 124, the first spectral filter 158, and the first detector 176 of the focal plane array 102. As a result, electromagnetic radiation corresponding to the capture-portion 116 of the area 114 that reaches the first spectral filter 158 is filtered to pass the first wavelength range and to block wavelengths outside the first wavelength range such that, when the first image 190 is captured, a corresponding pixel (e.g., a pixel having a value based on the measured intensity value of the first detector 176 of the focal plane array 102) in the first image 190 includes data indicating an intensity of electromagnetic radiation received at the first detector 176. Other pixels in the first image 190 include data indicating an intensity of electromagnetic radiation received at other detectors 108 in the focal plane array 102, such as electromagnetic radiation that has been filtered through a corresponding spectral filter or polarization filter of the focal plane array 102. Thus, the first image 190 includes multiple pixels, where each pixel has a single pixel value depending on which spectral filter or polarization filter filtered the received electromagnetic radiation for the portion of the area 114 corresponding to that pixel.

Figure 8B:
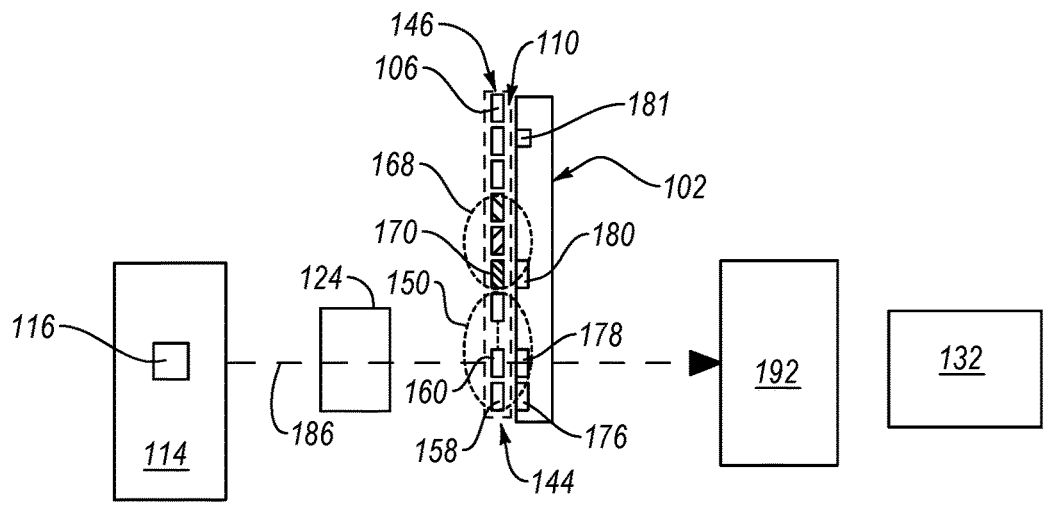
FIG. 8B is a schematic block diagram of a second linear alignment between the capture area and a second detector of the focal plane array, according to one or more examples of the present disclosure.

In FIG. 8B, a second linear alignment 186 is shown between the capture-portion 116 of the area 114 and the second detector 178 of the focal plane array 102. The capture-portion 116 is aligned with the second detector 178 and the second spectral filter 160 of the filter device 110 to produce the second image 192 that is stored in storage 132. For example, a line indicative of the second linear alignment 186 intersects the capture-portion 116 of the area 114, the lens system 124, the second spectral filter 160, and the second detector 178 of the focal plane array 102. Thus, one or more components (e.g., the lens system 124, the filter device 110, or the focal plane array 102) is adjusted such that the capture-portion 116 of the area 114 is aligned with the second spectral filter 160 in substantially the same manner as the capture-portion 116 of the area 114 was aligned with the first spectral filter 158 in the first linear alignment 184. In other words, the capture-portion 116 of the area 114, the second detector 178, and the second spectral filter 160 are aligned in the same or substantially similar (i.e., essentially or near the same) linear arrangement and orientation when the second image 192 is captured, as the capture-portion 116 of the area 114, the first detector 176, and the first spectral filter 158 were aligned when the first image 190 was captured. For example, the one or more components is adjusted based on a physical dimension or size (e.g., a filter size) of an individual spectral filter such that the second linear alignment 186 substantially similar to the first linear alignment 184. In one example, the filter device 110 is fixed to the focal plane array 102, such that the filter device 110 does not move relative to the focal plane array 102. Accordingly, the focal plane array 102 is moved by a distance matching the physical size of an individual spectral filter to achieve the second linear alignment 186. As a result, the capture-portion 116 of the area 114 is filtered through the second wavelength range such that, when the second image 192 is captured, a pixel corresponding with the second detector 178 includes data indicating an intensity of electromagnetic radiation received at the second detector 178.

In other examples, not shown, the filter device 110 is moved relative to the focal plane array 102, such that the filter device 110 is moved by a distance matching the physical size of an individual spectral filter to achieve the second linear alignment 186. The second image 192 further depicts other portions of the area 114 in single colors, polarizations, or through sounding filters corresponding to alignments with other filters.

Figure 8C:
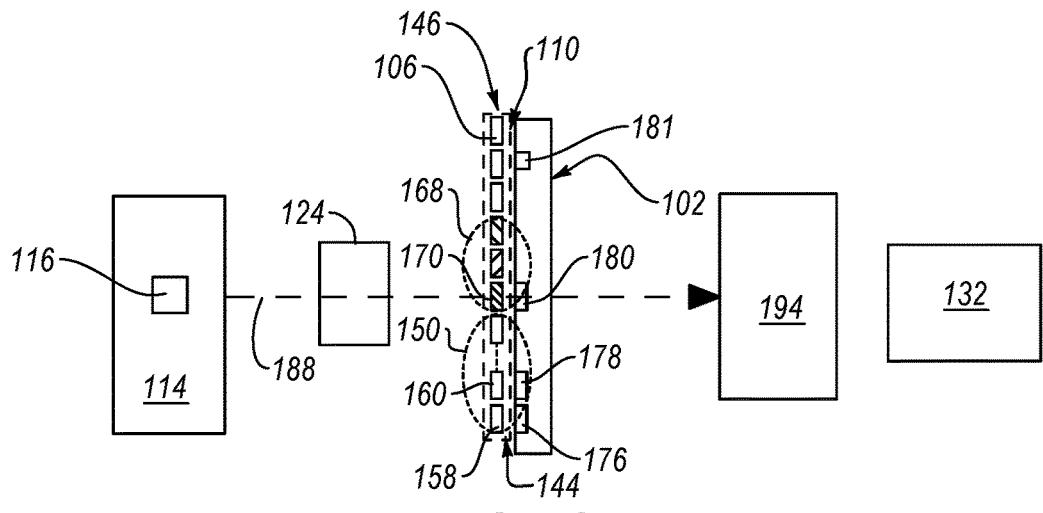
FIG. 8C is a schematic block diagram of a third linear alignment between the capture area and a third detector of the focal plane array, according to one or more examples of the present disclosure.

As shown in FIG. 8C, a third linear alignment 188 is shown between the capture-portion 116 of the area 114 and the third detector 180 of the focal plane array 102. The capture-portion 116 is aligned with the third detector 180 and a first polarization channel 170 of the plurality of polarization channels 168 of the filter device 110 to produce the third image 194 that is stored in storage 132. For example, a line indicative of the third linear alignment 188 intersects the capture-portion 116 of the area 114, the lens system 124, the first polarization channel 170, and the third detector 180 of the focal plane array 102. As explained above in reference to FIG. 8B, one or more components are adjusted such that the capture-portion 116 of the area 114 is aligned with the first polarization channel 170 in substantially the same manner as the capture-portion 116 of the area 114 was aligned with the first spectral filter 158 in the first linear alignment 184. In other words, the capture-portion 116 of the area 114, the third detector 180, and the first polarization channel 170 are aligned in the same or substantially similar linear arrangement and orientation when the third image 194 is captured, as the capture-portion 116 of the area 114, the first detector 176, and the first spectral filter 158 were aligned when the first image 190 was captured. As a result, the capture-portion 116 of the area 114 is filtered through the first polarization channel 170 such that, when the third image 194 is captured, a pixel corresponding to the third detector 180 includes data indicating a polarization received at the third detector 180. The third image 194 depicts other portions of the area 114 in single colors, polarizations, or through sounding filters corresponding to alignments with other filters.

Figure 8D:
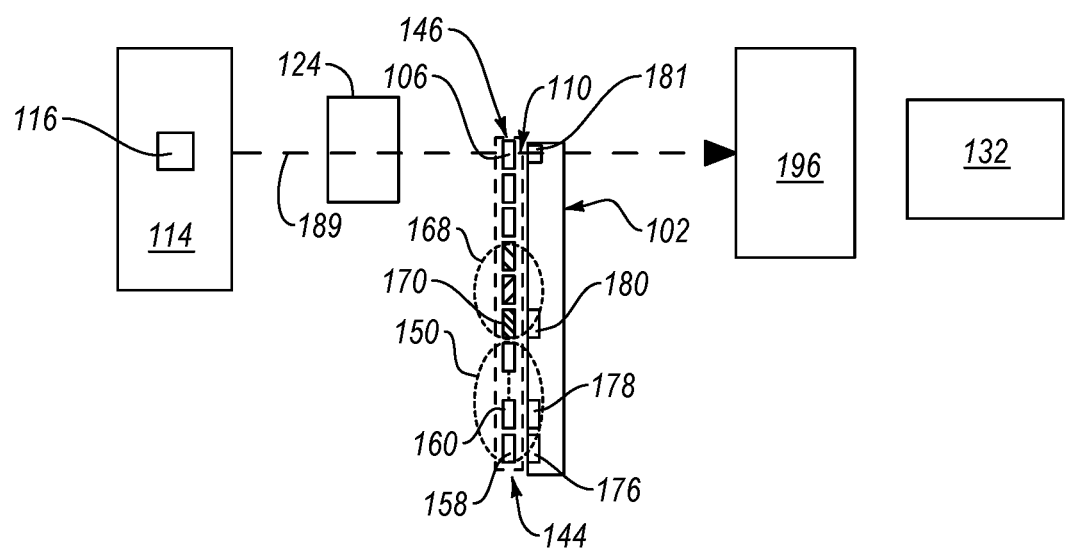
FIG. 8D is a schematic block diagram of a fourth linear alignment between the capture area and a fourth detector of the focal plane array, according to one or more examples of the present disclosure.

As shown in FIG. 8D, a fourth linear alignment 189 is shown between the capture-portion 116 of the area 114 and the fourth detector 181 of the focal plane array 102. The capture-portion 116 is aligned with the fourth detector 181 and one of the plurality of sounding filters 106 of the filter device 110 to produce at least one atmospheric measurement 196 that is stored in storage 132. For example, a line indicative of the fourth linear alignment 189 intersects the capture-portion 116 of the area 114, the lens system 124, the one of the plurality of sounding filters 106, and the fourth detector 181 of the focal plane array 102. As explained above in reference to FIG. 8B, one or more components are adjusted such that the capture-portion 116 of the area 114 is aligned with the one of the sounding filters 106 in substantially the same manner as the capture-portion 116 of the area 114 was aligned with the first spectral filter 158 in the first linear alignment 184. In other words, the capture-portion 116 of the area 114, the fourth detector 181, and the one of the plurality of sounding filters 106 are aligned in the same or substantially similar linear arrangement and orientation when the fourth image 196 is captured, as the capture-portion 116 of the area 114, the first detector 176, and the first spectral filter 158 were aligned when the first image 190 was captured. As a result, the capture-portion 116 of the area 114 is filtered through the one of the sounding filters 106 such that, when the at least one atmospheric measurement 196 is captured, a pixel corresponding to the fourth detector 181 includes data indicating a characterization of atmospheric conditions received at the fourth detector 181.

Additionally, although not shown, the capture-portion of the area can be aligned with a fifth detector and a second polarization filter of the filter device to produce a fifth image that is stored in storage. For example, a fifth linear alignment can intersect the capture-portion of the area, the lines, the second polarization filter, and the fifth detector of the focal plane array. As a result, the capture-portion of the area is filtered through the second polarization filter such that, when the fifth image is capture, a pixel corresponding with the fifth detector includes data indicating a polarization received at the fifth detector. The fifth image depicts other portions of the area in single colors, polarizations, or sounding filters corresponding to alignments with other filters.

Once saved, at least the first image 190, the second image 192, and third image 194 are calibrated (e.g., effects of atmospheric conditions are adjusted) using the at least one atmospheric measurement 196, to generate a calibrated first image, a calibrated second image, and a calibrated third image. In some examples, the atmospheric measurement 196 is used to calibrated the images to remove atmospheric effects or influence (e.g., colorization). In other examples, the atmospheric measurement 196 is used to calibrate the image to be consistent with some standard reference atmospheric conditions. The calibrated first image, calibrated second image, and calibrated third image are used to generate a multi-spectral and polarization composite image that has a relatively high spectral resolution for the capture-portion 116 of the area 114. For example, the resolution for the capture-portion 116 of the area 114 in the composite image is higher than the resolution of the capture-portion 116 of the area 114 in individual images, such as the calibrated first image, the calibrated second image, and the calibrated third image. In some examples, additional images, such as the fifth image, are calibrated using the at least one atmospheric measurement 196 and used to generate a multi-spectral and multi-polarization composite image. By adding additional images for each pixel in the focal plane array 102, corresponding to spectral filters and/or polarization filters, a high-quality composite image can be generated. Thus, the resolution of a composite image can be improved by capturing multiple images, such as the first image 190, the second image 192 and the third image 194 with a substantially similar linear alignment between the capture-portion 116 of the area 114 and detectors of the focal plane array 102, with different configurations of the spectral filters and polarization filters.

Figure 9:
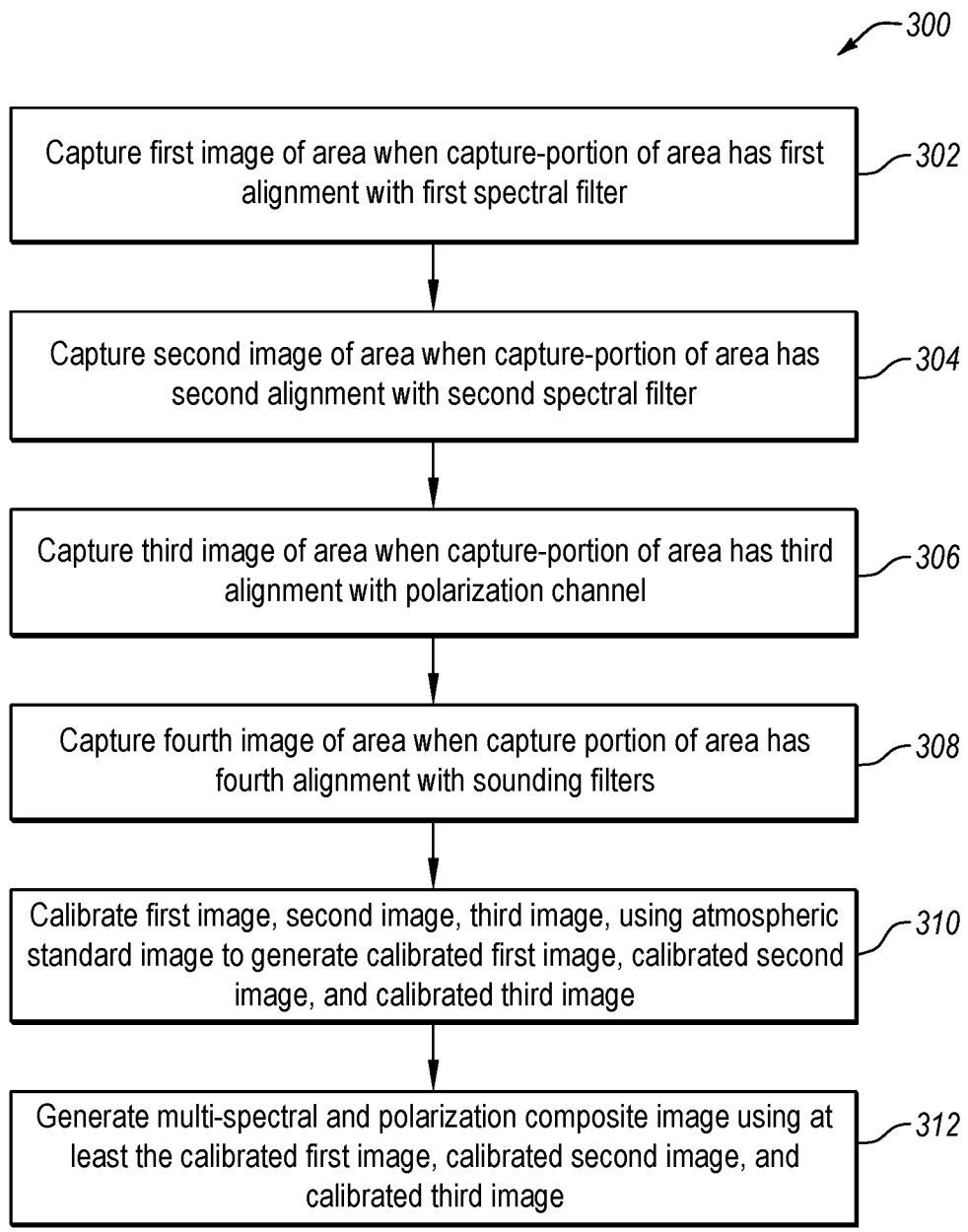
FIG. 9 is a schematic flow diagram of a method of capturing image data, according to one or more examples of the present disclosure.

As shown in FIG. 9, according to some examples, a method 300 of capturing image data with the image capture system 200 of FIG. 8A-8D is shown. The method 300 includes the step of (block 302) capturing, with an image capture apparatus 100, a first image 190 of an area 114 when a capture-portion 116 of the area 114 is in a first linear alignment 184 with a first spectral filter 158 of a filter device 110 and a corresponding one of a plurality of detectors 108 of a focal plane array 102. The filter device 110 is coupled to the focal plane array 102. In some examples, the controller 112 is configured to initiate capture of the first image of the area 114 while the capture-portion 116 of the area 114 has the first linear alignment 184 with the corresponding detector 108, and the first spectral filter 158 is between the capture-portion 116 of the area 114 and the corresponding detector.

The method 300 also includes the step of (block 304) capturing, with the image capture apparatus 100, a second image 192 of the area 114 when the capture-portion 116 of the area 144 is in a second linear alignment 186 with a second spectral filter 160 of the filter device 110 and a corresponding one of the plurality of detectors 108, the second linear alignment 186 substantially similar to the first linear alignment 184. In some examples, the controller 112 is further configured to determine (e.g., detect or measure) when the capture-portion 116 of the area 114 has the second linear alignment 186 with the corresponding detector 108 of the focal plane array 102. In response to determining that the capture-portion 116 of the area 114 has the second linear alignment 186 and that the second spectral filter 160 is between the capture-portion 116 of the area and the corresponding detector 108, the controller 112 is configured to initiate storage of the second image 192. The second image captured while the capture-portion 116 of the area 114 has the second linear alignment 186 with the corresponding detector 108. In some examples, the detector corresponding to the first spectral filter 158 and the detector corresponding to the second spectral filter 160 are different detectors. For example, when the focal plane array 102 has moved, relative to the area 114, by at least one detector width between capture of the first image 190 and capture of the second image 192. In other examples, the detector corresponding to the first spectral filter 158 and the detector corresponding to the second spectral filter 160 are the same detector. For example, the focal plane array 102 has not substantially moved relative to the area 114 between capture of the first image 190 and capture of the second image 192, rather the filter device 110 has moved.

The controller 112, in some examples, is configured to cause a position of one or more component of the image capture apparatus 100 to be adjusted to generate the second linear alignment 186 of the capture-portion 116 of the area 114 with the corresponding detector 108. The one or more components can include the filter device 110, the focal plane array 102, or the lens system 124. In other examples, the position of one or more component of the image capture apparatus 100 can be adjusted by adjusting a platform on which the image capture apparatus 100 is coupled. When the composite image is to be formed of an object that is moving, relative to the image capture apparatus 100 (e.g., a planet, asteroid, or a man-made vehicle or other object), the controller 112 may control the adjustment of the orientation of the image capture apparatus 100 and timing of the image captures such that the sequence of image captures have the desired sequence of alignments to the object.

The method further includes the step of (block 306) capturing, with the image capture apparatus 100, a third image 194 of the area 114 when the capture-portion 116 of the area 114 is in a third linear alignment 187 with one of a plurality of polarization channels 168 and a corresponding one of the plurality of detectors 108, the third linear alignment 187 substantially similar to the first linear alignment 184. In some examples, the controller 112 is further configured to determine (e.g., detect or measure) when the capture-portion 116 of the area 114 has the third linear alignment 187 with the corresponding detector of the focal plane array 102. In response to determining that the capture-portion 116 of the area 114 has the third linear alignment 187 and that the polarization channel 168 is between the capture-portion 116 of the area and the corresponding detector, the controller 112 is configured to initiate storage of the third image 194. The third image 194 captured while the capture-portion 116 of the area 114 has the third linear alignment 187 with the corresponding detector 108.

The method further includes the step of (block 308) capturing, with the image capture apparatus 100, at least one atmospheric measurement 196 of the area 114 when the capture-portion 116 of the area 114 is in a fourth linear alignment 189 with one of a plurality of sounding filters 106 and a corresponding one of the plurality of detectors 108, the fourth linear alignment 189 substantially similar to the first linear alignment 184. In some examples, the controller 112 is further configured to determine when the capture-portion 116 of the area 114 has the fourth linear alignment 189 with the corresponding detector of the focal plane array 102. In response to determining that the capture-portion 116 of the area 114 has the fourth linear alignment 189 and that the sounding filter 106 is between the capture-portion 116 of the area and the corresponding detector, the controller 112 is configured to initiate storage of the at least one atmospheric measurement 196. The at least one atmospheric measurement 196 captured while the capture-portion 116 of the area 114 has the fourth linear alignment 189 with the corresponding detector 108.

Furthermore, the method also includes the step of (block 310) calibrating the first image 190, the second image 192, and the third image 194, using the atmospheric measurement 196, to generate a calibrated first image, a calibrated second image, and a calibrated third image. In some examples, the atmospheric measurement 196 can be used to either cancel atmospheric effects or normalize the effects to a standard reference atmosphere. Accordingly, the calibrated first image, the calibrated second image, and the calibrated third image have the effects of the atmospheric conditions, such as water content or $CO_2$, removed or normalized from the images resulting in a more authentic image of the area 114. In some examples, the first image 190, the second image 192, and the third image 194, are calibrated in real time, as the images are captured or immediately after the images are captured, using at least one atmospheric measurement 196. In other examples, the first image 190, the second image 192, and the third image 194, are calibrated at a time after the images are captured, using at least one atmospheric measurement 196. For example, the first image 190, the second image 192, and the third image 194, can be calibrated hours or days after the images were captured.

The method additionally includes the step of (block 312) generating a multi-spectral and polarization composite image using at least the calibrated first image 190, the calibrated second image 192, and the calibrated third image 194. The multi-spectral and polarization composite image may have a relatively high spectral resolution for the capture-portion 116 of the area 114. For example, the spectral resolution for the capture-portion 116 of the area 114 in the multi-spectral composite image is higher than the spectral resolution of the capture-portion 116 of the area 114 in the individual images. Thus, the image capture apparatus 100 enables improved spectral resolution of the composite image by capturing multiple images (e.g., the first image 190, the second image 192, and the third image 194) with a substantially similar linear alignment between the capture-portion 116 of the area 114, the focal plane array 102, and using different configurations of the spectral filters. Accordingly, the resulting image(s) can be added to the composite image to generate a multi-spectral and polarization composite image.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. An image capture apparatus comprising:
a focal plane array comprising a plurality of detectors; and
a filter device coupled with and covering the focal plane array, the filter device comprising:
at least one set of spectral filters, comprising at least a first spectral filter, which comprises a first wavelength range, and a second spectral filter, which comprises a second wavelength range that is different than the first wavelength range;
a plurality of polarization channels, each having a polarization value that is different than the polarization value of any other of the plurality of polarization channels; and
a plurality of sounding filters, each operable within a spectral wavelength range and each configured to determine a characterization of atmospheric conditions.

2. The image capture apparatus of claim 1, wherein the plurality of sounding filters are positioned along a plane that is parallel to a cross-scan direction of the filter device, which is parallel to the at least one set of spectral filters.

3. The image capture apparatus of claim 2, wherein the plurality of sounding filters are positioned along a leading edge of the filter device.

4. The image capture apparatus of claim 1, wherein the plurality of sounding filters are positioned along a side edge of the filter device, perpendicular to a leading edge of the filter device, and perpendicular to the at least one set of spectral filters.

5. The image capture apparatus of claim 4, wherein:
one of the plurality of sounding filters corresponds with at least the first spectral filter, such that a plane, perpendicular to a scan direction, passes through the one of the plurality of sounding filters and the first spectral filter; and
the spectral wavelength range of the one of the plurality of sounding filters is inclusive of, and larger than, the first wavelength range of the first spectral filter.

6. The image capture apparatus of claim 1, wherein:
at least one of the plurality of sounding filters is positioned along a plane that is parallel to a cross-scan direction of the filter device, which is parallel to the at least one set of spectral filters; and
at least another one of the plurality of sounding filters is positioned along a plane that is parallel to a scan direction of the filter device, which is perpendicular to the at least one set of spectral filters.

7. The image capture apparatus of claim 6, wherein the spectral wavelength range of the at least one of the plurality of sounding filters is the same as the spectral wavelength range of the at least another one of the plurality of sounding filters.

8. The image capture apparatus of claim 1, wherein a combined total outward-facing surface area of the plurality of sounding filters is less than ten percent of a total outward-facing surface area of the filter device.

9. The image capture apparatus of claim 1, wherein the spectral wavelength range of at least one of the plurality of sounding filters is different than the spectral wavelength range of at least another one of the plurality of sounding filters.

10. The image capture apparatus of claim 1, wherein the plurality of polarization channels includes at least three polarization channels.

11. The image capture apparatus of claim 1, wherein the polarization value of each one of the polarization channels is chosen from a group consisting of a vertical polarization, a horizontal polarization, a positive 45-degree polarization, a negative 45-degree polarization, a left-hand circular polarization, and a right-hand circular polarization.

12. The image capture apparatus of claim 1, wherein the first wavelength range is associated with a first color and the second wavelength range is associated with a second color that is different than the first color.

13. The image capture apparatus of claim 1, wherein the filter device comprises at least four sets of spectral filters.

14. An image capture system comprising:
a focal plane array comprising a plurality of detectors;
a filter device coupled with and covering the focal plane array, the filter device comprising:
at least one set of spectral filters, comprising at least a first spectral filter, which comprises a first wavelength range, and a second spectral filter, which comprises a second wavelength range that is different than the first wavelength range;
a plurality of polarization channels, each having a polarization value that is different than the polarization value of any other of the plurality of polarization channels; and
a plurality of sounding filters, each operable within a spectral wavelength range and each configured to determine a characterization of atmospheric conditions; and
a controller communicatively coupled with the filter device and the focal plane array, the controller configured to:
control the plurality of detectors of the focal plane array to:
capture a first image of an area when a capture-portion of the area is in a first linear alignment with the first spectral filter and a corresponding one of the plurality of detectors;
capture a second image of the area when the capture-portion of the area is in a second linear alignment with the second spectral filter and a corresponding one of the plurality of detectors, the second linear alignment substantially similar to the first linear alignment;
capture a third image of the area when the capture-portion of the area is in a third linear alignment with one of the plurality of polarization channels and a corresponding one of the plurality of detectors, the third linear alignment substantially similar to the first linear alignment; and
capture at least one atmospheric measurement of the area when the capture-portion of the area is in a fourth linear alignment with one of the plurality of sounding filters and a corresponding one of the plurality of detectors, the fourth linear alignment substantially similar to the first linear alignment;
calibrate the first image, the second image, and the third image, using the at least one atmospheric measurement, to generate a calibrated first image, a calibrated second image, and a calibrated third image; and generate a multi-spectral and polarization composite image using at least the calibrated first image, the calibrated second image, and the calibrated third image.

15. The image capture system of claim 14, wherein the first image, the second image, and the third image are calibrated in real-time, as the first image, the second image, and the third image are captured.

16. The image capture system of claim 14, wherein the first image, the second image, and the third image are calibrated at a time after the first image, the second image, and the third image are captured.

17. The image capture system to claim 14, wherein:
the filter device is fixed to the focal plane array, such that the filter device does not move relative to the focal plane array; and
the controller is further configured to control adjustment of the position of the focal plane array, relative to the capture-portion of the area, to generate the second linear alignment, the third linear alignment, and the fourth linear alignment, with the capture-portion of the area.

18. A method of capturing image data, the method comprising steps of:
capturing, with an image capture apparatus, a first image of an area when a capture-portion of the area is in a first linear alignment with a first spectral filter of a filter device and a corresponding one of a plurality of detectors of a focal plane array, the filter device coupled to the focal plane array;
capturing, with the image capture apparatus, a second image of the area when the capture-portion of the area is in a second linear alignment with a second spectral filter of the filter device and a corresponding one of the plurality of detectors, the second linear alignment substantially similar to the first linear alignment;
capturing, with the image capture apparatus, a third image of the area when the capture-portion of the area is in a third linear alignment with one of a plurality of polarization channels and a corresponding one of the plurality of detectors, the third linear alignment substantially similar to the first linear alignment;
capturing, with the image capture apparatus, at least one atmospheric measurement of the area when the capture-portion of the area is in a fourth linear alignment with one of a plurality of sounding filters and a corresponding one of the plurality of detectors, the fourth linear alignment substantially similar to the first linear alignment;
calibrating the first image, the second image, and the third image, using the at least one atmospheric measurement, to generate a calibrated first image, a calibrated second image, and a calibrated third image; and
generating a multi-spectral and polarization composite image using at least the calibrated first image, the calibrated second image, and the calibrated third image.

19. The method of claim 18, wherein the step of calibrating the first image, the second image, and the third image, using the at least one atmospheric measurement, further comprises calibrating the first image, the second image and the third image, in real time, as the first image, the second image, and the third image are captured.

20. The method of claim 18, wherein the step of calibrating the first image, the second image, and the third image using the at least one atmospheric measurement further comprises calibrating the first image, the second image and the third image at a time after the first image, the second image, and the third image are captured.

* * * * *